No. 607,987. Patented July 26, 1898.
E. DIEHL, F. RUPPERT & F. LÖSER.
ELLIPSE CUTTING MECHANISM FOR PLANERS.
(Application filed Oct. 5, 1897.)
(No Model.) 2 Sheets—Sheet 1.
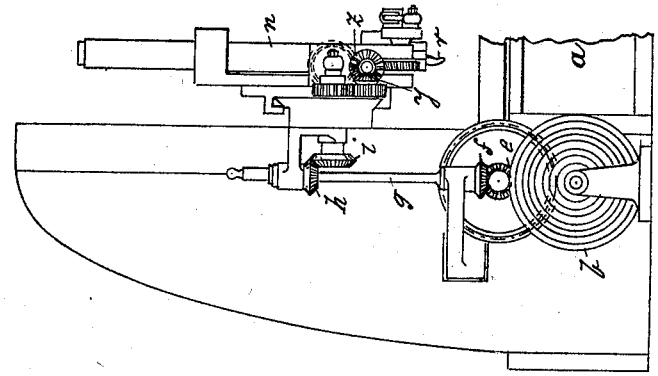
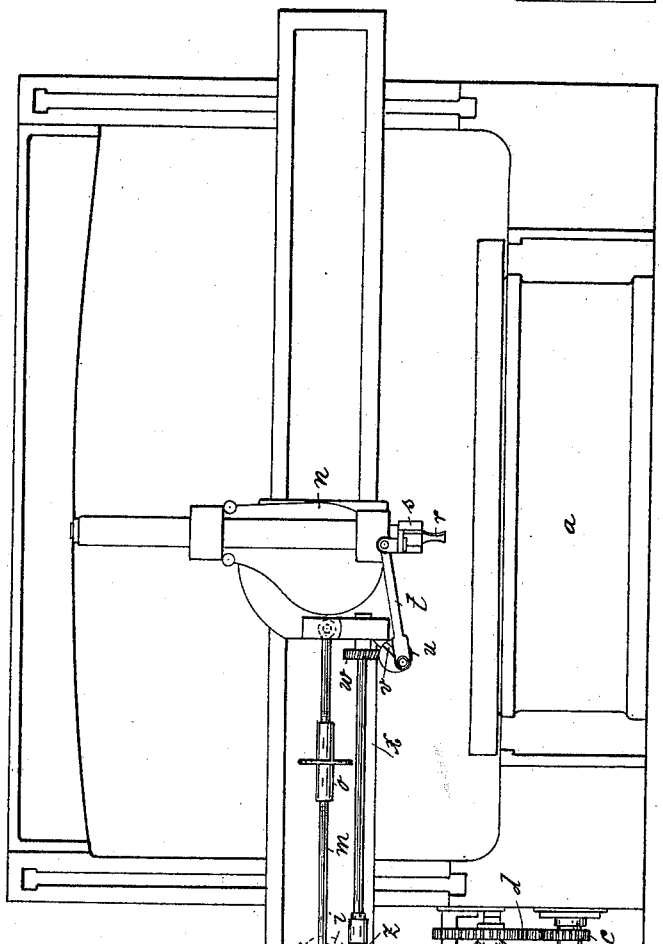
Witnesses:
Inventors:
Emil Diehl
Friedrich Ruppert
Franz Löser
By Richardson
their Attorneys

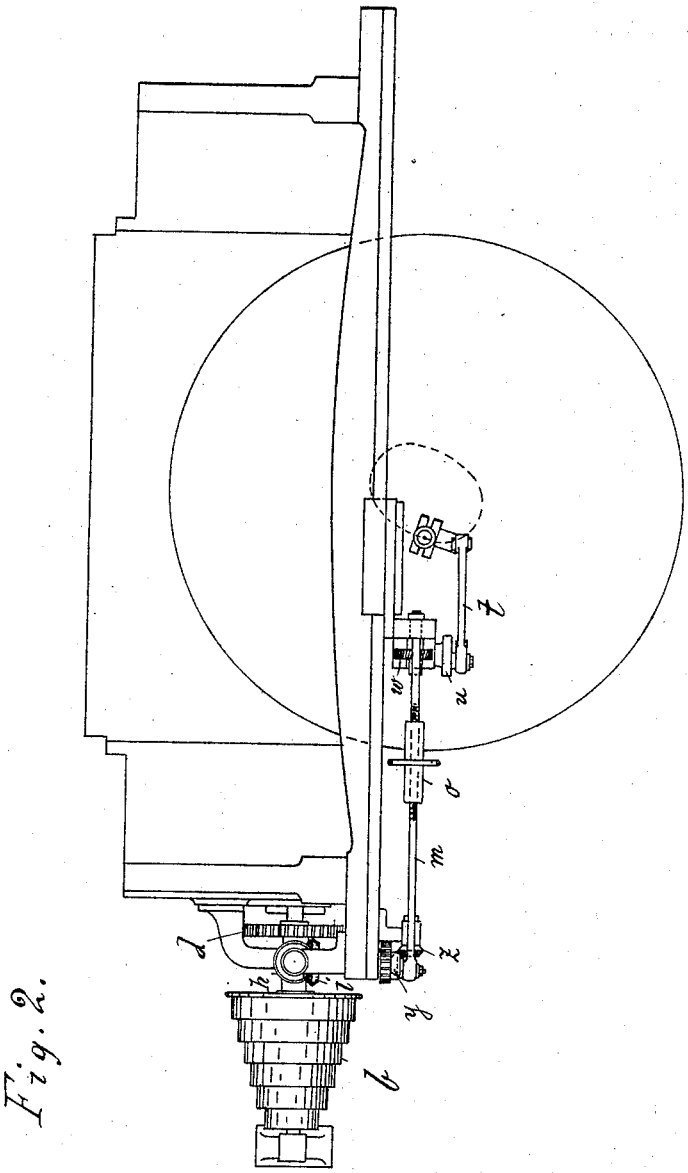

UNITED STATES PATENT OFFICE.

EMIL DIEHL, FRIEDRICH RUPPERT, AND FRANZ LÖSER, OF CHEMNITZ, GERMANY, ASSIGNORS TO WERKZEUG MASCHINENFABRIK "UNION," (VORMALS DIEHL,) OF SAME PLACE.

ELLIPSE-CUTTING MECHANISM FOR PLANERS.

SPECIFICATION forming part of Letters Patent No. 607,987, dated July 26, 1898.

Application filed October 5, 1897. Serial No. 654,178. (No model.)

*To all whom it may concern:*

Be it known that we, EMIL DIEHL, FRIEDRICH RUPPERT, and FRANZ LÖSER, engineers, citizens of Saxony, residing at Chemnitz, Saxony, Germany, have invented certain new and useful Improvements in Ellipse-Cutting Mechanism for Planers; and we do hereby declare the following to be a full, clear, and exact description of the invention, such as will enable others skilled in the art to which it appertains to make and use the same.

This invention has for its object to produce in planers having vertical spindles such a transfer of motion between the revoluble circular work-table on the one hand and the tool-support and tool-holder on the other hand as to impart a reciprocating movement to the tool-holder while the work-table is executing a circular movement. The curve thereby described by the tool on the article to be worked is an oval or ellipse if the tool moves twice to and fro (reciprocates twice) to one revolution of the table. The connection between the tool-support and the crank-disk transferring the motion of the work-table is such that it may be adjusted according to the size of the oval—that is to say, shortened for larger ovals and lengthened for smaller ones. As in this straight lateral movement of the tool-support the lateral angle of adjustment of the tool is constantly altered, its cutting edges assuming at each moment a different angle to the periphery of the resulting ellipse or oval, it is of great importance for the cleanness of the cut and the durability of the tool to have the side edges of the latter always placed at the same angle to the periphery of the curve. This is attained by the tool-holder in the to-and-fro movement of the support, receiving an automatic oscillating movement on its vertical axis in such a way that the front edge of the tool is always directed tangentially to the resulting curve. This mode of working, in addition to the advantages hereinbefore enumerated, allows of very narrow tools being used. A planer fitted with this arrangement is shown in the accompanying drawings, in which—

Figure 1 is an elevation; Fig. 2, a plan view, and Fig. 3 a side view.

The machine here shown is more particularly suitable for cutting out oval holes in boiler-plates—for instance, for making manholes—and therefore its mode of working will be described as an example of this, though of course it may be employed also for preparing other similarly-shaped parts.

The article to be operated on is laid on a table $a$ and rotated slowly in the ordinary manner with the table, the driving taking place by means of a step-pulley $b$. This movement is conveyed by means of spur-wheels $c$ $d$, bevel-wheels $e\,f$, shaft $g$, and bevel-wheels $h\,i$ to a crank-disk $k$. The crank-disk $k$ is provided with a crank-slot $l$ to allow of the crank-wrist of the rod $m$, which reciprocates the tool-support $n$, being adjusted according to the required size of the oval to be cut. The rod $m$ consists of two parts connected by a sleeve $o$, having a right and left hand screw-thread. By rotating the sleeve the rod may be shortened for larger ovals and lengthened for smaller ones. The throw of the crank-disk is made equal to one-half the difference between the lengths of the major and minor axes of the ellipse or oval. On its outward movement the rod $m$ acts as a push-rod and on its return as a draw-rod.

The ratio of transfer of movement from the work-table $a$ to the crank-disk $k$ must be so selected that the crank-disk makes two revolutions while the work-table is describing one revolution, as the change from the minor to the major axis of the ellipse, and vice versa, must take place twice. Consequently the tool-support will make two movements to and fro to one revolution of the circular work-table.

The tool or cutter $r$ is fixed in a tool-holder $s$, which is revoluble on its vertical axis. In order to allow of the tool-holder being automatically oscillated on its vertical axis, it is connected, by means of a connecting-rod $t$, with a crank-disk $u$, the crank-wrist of which may be adjusted in a slot $v$ therein. The crank-disk $u$ is rotated by means of a spur-wheel $w$, the shaft $x$ of which is operated with a suitable ratio of transfer by means of bevel-wheels $y\,z$ from the same shaft $g$ that revolves the disk $k$. By suitably adjusting the crank-wrist of the rod $t$ on the disk $u$ the tool-holder *s* may be caused to automatically oscillate on its vertical axis in such a way that the front edge of the tool is always directed tangentially to the resulting ellipse or oval.

Having now particularly described and ascertained the nature of our invention and in what manner the same is to be performed, we declare that what we claim is—

In a machine for cutting elliptical openings in metal plates, the combination with the rotary work-supporting table, of the horizontal elevated track, the tool-carrier movably carried thereby, the tool rotatably carried by said carrier and having a laterally-extending arm, the driving-disk, the adjustable pitman adjustably connected with said disk and connected also with the carriage and operating also to reciprocate the same a distance equal to the difference between the major and minor axes of the ellipse to be cut, the second driving-disk, and the pitman connecting said second disk with the arm on the tool for rotating the latter, substantially as described.

In testimony whereof we affix our signatures in presence of two witnesses.

EMIL DIEHL.
    FRIEDRICH RUPPERT.
    FRANZ LÖSER.

Witnesses:
 OSKAR UFERL,
 FRANZ LOHNEER.